US 6,669,403 B2

(12) United States Patent
Clark et al.

(10) Patent No.: US 6,669,403 B2
(45) Date of Patent: Dec. 30, 2003

(54) WAVE ATTENUATOR (75) Inventors: John Clark, Sodus Point, NY (US); Timothy R. Dicey, Rochester, NY (US)

(73) Assignee: Wave Control Systems Inc., Sodus Point, NY (US)

(*) Notice: Subject to any disclaimer, the term of this patent is extended or adjusted under 35 U.S.C. 154(b) by 0 days.

(21) Appl. No.: 10/118,108

(22) Filed: Apr. 6, 2002

(65) Prior Publication Data

US 2003/0190191 A1 Oct. 9, 2003

(51) Int. Cl.[7] ................................................. E02B 3/06
(52) U.S. Cl. .......................... 405/30; 405/26; 405/21; 405/28; 405/33
(58) Field of Search ........................... 405/26, 21, 30, 405/28, 33, 35, 63, 70, 76, 15, 16

(56) References Cited

U.S. PATENT DOCUMENTS

| 527,513 A | | 10/1894 | See et al. |
|---|---|---|---|
| 953,051 A | * | 3/1910 | DeMuralt ..................... 405/16 |
| 1,593,863 A | | 7/1926 | Brasher |
| 3,237,414 A | | 3/1966 | Straub et al. |
| 3,373,821 A | | 3/1968 | Sare et al. |
| 3,755,829 A | | 9/1973 | Walklet |
| 3,822,499 A | | 7/1974 | DeVos |
| 3,842,606 A | | 10/1974 | Stiles et al. |
| 3,846,990 A | | 11/1974 | Bowley |
| 3,894,397 A | | 7/1975 | Fair |
| 3,938,338 A | | 2/1976 | Cullen |
| 3,991,576 A | * | 11/1976 | Tazaki et al. .................. 405/21 |
| 4,027,486 A | | 6/1977 | Dougherty |
| 4,118,937 A | | 10/1978 | Mansen |
| 4,175,887 A | | 11/1979 | Mougin |
| 4,178,517 A | | 12/1979 | Salomon et al. |
| 4,206,748 A | * | 6/1980 | Goodman et al. .......... 126/668 |
| 4,234,266 A | | 11/1980 | Angioletti |
| 4,264,233 A | | 4/1981 | McCambridge |
| 4,341,489 A | | 7/1982 | Karnas |
| 4,407,607 A | | 10/1983 | McCambridge |
| 4,431,337 A | | 2/1984 | Iwasa |
| 4,669,913 A | | 6/1987 | Temple |
| 4,691,661 A | | 9/1987 | Deiana |
| 4,712,944 A | | 12/1987 | Rose |
| 4,729,691 A | | 3/1988 | Sample |
| 4,729,692 A | | 3/1988 | Tucker |
| 4,748,338 A | | 5/1988 | Boyce |
| 4,776,724 A | | 10/1988 | Isozaki |
| 4,776,725 A | | 10/1988 | Brade |
| 4,844,654 A | | 7/1989 | Widerman |
| 4,856,933 A | | 8/1989 | Tubbs, Jr. |
| 4,856,934 A | | 8/1989 | Nelson |
| 4,856,935 A | | 8/1989 | Haras |
| 4,900,188 A | | 2/1990 | Haselton et al. |
| 5,104,258 A | | 4/1992 | Ianell |
| 5,122,015 A | | 6/1992 | Shen |
| 5,192,161 A | | 3/1993 | Helgesson et al. |
| 5,238,325 A | | 8/1993 | Krenzler |
| 5,238,326 A | | 8/1993 | Creter |

(List continued on next page.)

FOREIGN PATENT DOCUMENTS

| FR | 2663900 A1 | 1/1901 |
| GB | 805789 | 12/1958 |

Primary Examiner—Robert J. Sandy
Assistant Examiner—Katherine Mitchell
(74) Attorney, Agent, or Firm—Stephen B. Salai, Esq.; Donna P. Suchy, Esq.; Harter, Secrest & Emery LLP (57) ABSTRACT An apparatus and system for dissipating water wave energy and for shoreline control including a module with a generally hollow body, a pair of opposed flanges attached to adjacent corners of the body, a pair of axially aligned mounting apertures in the flanges for connecting the body to similar bodies for forming a wave energy dissipation system, and a recess disposed between the flanges. Each recess contains a plurality of boundary layer interrupting projections for substantially disrupting any laminar flow of water past the surface and creating turbulent flow.

17 Claims, 11 Drawing Sheets

U.S. PATENT DOCUMENTS

| | | |
|---|---|---|
| 5,246,307 A | 9/1993 | Rauch |
| 5,250,696 A | 10/1993 | Dunlap et al. |
| 5,259,696 A | 11/1993 | Beardsley |
| 5,556,229 A | 9/1996 | Bishop et al. |
| 5,564,369 A | 10/1996 | Barber et al. |
| 5,575,584 A | 11/1996 | Alsop |
| 5,700,108 A | 12/1997 | Bishop et al. |
| 5,879,105 A | 3/1999 | Bishop et al. |

* cited by examiner

WAVE ATTENUATOR

FIELD OF INVENTION

This invention relates to devices and means by which water wave energy is reduced or dissipated to control erosion and deposition of beach sand and minimize movement of floating docking systems, and more particularly to easy to install and remove devices made from a multiplicity of modular elements.

BACKGROUND

Breakwaters, seawalls, jetties and groynes are structures intended to dissipate incoming water wave energy and to reduce or change shoreline erosion and deposition. These structures are permanent, expensive, often unsightly and have limited in effectiveness. Typically, these structures act as barriers that redirect or absorb incoming wave energy. Often this energy undermines and helps destroy these structures, or as redirected energy it continues to erode or deposit materials in other locations farther along the shoreline.

Various modular offshore systems utilizing tires or other elements have been introduced for purposes of erosion control, wave energy extraction, and the creation of artificial reefs to encourage the population of fish, crustacea and other aquatic life. These systems are constructed as groups that are rigidly anchored to the sea floor allowing for minimal movement. In particular, Bishop, U.S. Pat. No. 5,879,105 discloses a system of buoyant, hollow bodies, constructed to form islands in the form of inverted pyramids, rigidly anchored offshore to extract or disperse wave energy. These buoyant bodies are multi-faceted with solid protruding ends, that when connected together provide for a plurality of avenues arranged to extract the energy from the flowing water. Such an arrangement is only partially effective, having no specific design to break the laminar water flow into one of turbulence. The protruding ends make the individual bodies awkward to handle, stack and transport.

There is a need for a modular element that can be combined, with other elements, to form a wave energy dissipation system that has multiple recesses that will channel flowing water. When a plurality of these bodies are connected to form a wave attenuation system, the water will be channeled through a series of constrictions and voids which will dissipate the water wave energy by hydraulic resistance and friction. Critical to the effectiveness and efficiency of such a system is the need for these preferably buoyant bodies to break the laminar flow of the water into a state of turbulence. This state of turbulence increases the disorganization and chaos of the incoming water, greatly increasing the distance that individual cells of water have to travel in order to pass through the system. As these water cells have to travel farther through he system, the overall resistance to water flowing through the system is greatly increased.

The buoyant bodies are preferably designed so that they may be used in flotation, ballast or near neutral buoyancy situations with minimal or no modification. Any wave attenuation system constructed from these modules needs to accommodate different anchoring systems. The system must be easily movable to other locations and accommodate adjustments for buoyancy and flotation level.

There is also a need for the individual buoyant bodies to be easily and inexpensively manufactured. They should be light in weight, easily handled, stacked and transported. The buoyant body must be of a material that is inert and poses no threat to the environment. Further, the buoyant body and constructed wave attenuation system using a plurality of such bodies, needs to be highly versatile so that the construction of the system may be achieved in a number of different situations, e.g., a floating pontoon, the back of a boat, on the shore or even at a remote site and transported in sections to the deployment site.

The buoyant body should be of such a design that it may be used for other marine and near marine situations, e.g., support of floating docks, artificial reefs and beach creation devices.

SUMMARY OF INVENTION

In accordance with this invention, an apparatus and system for dissipating water wave energy and for shoreline control. Specifically it describes a wave control system including a module with a generally hollow body, a pair of opposed flanges attached to adjacent corners of the body, a pair of axially aligned mounting apertures in the flanges for connecting the body to similar bodies for forming a wave energy dissipation system, and a recess disposed between the flanges having a surface characterized by a plurality of boundary layer interrupting projections substantially disrupting any laminar flow of water past the surface and creating turbulent flow.

BRIEF DESCRIPTION OF THE DRAWINGS

In the detailed description of the preferred embodiment of the invention presented below, reference is made to the accompanying drawings which.

DETAILED DESCRIPTION OF THE INVENTION

Figure 1:
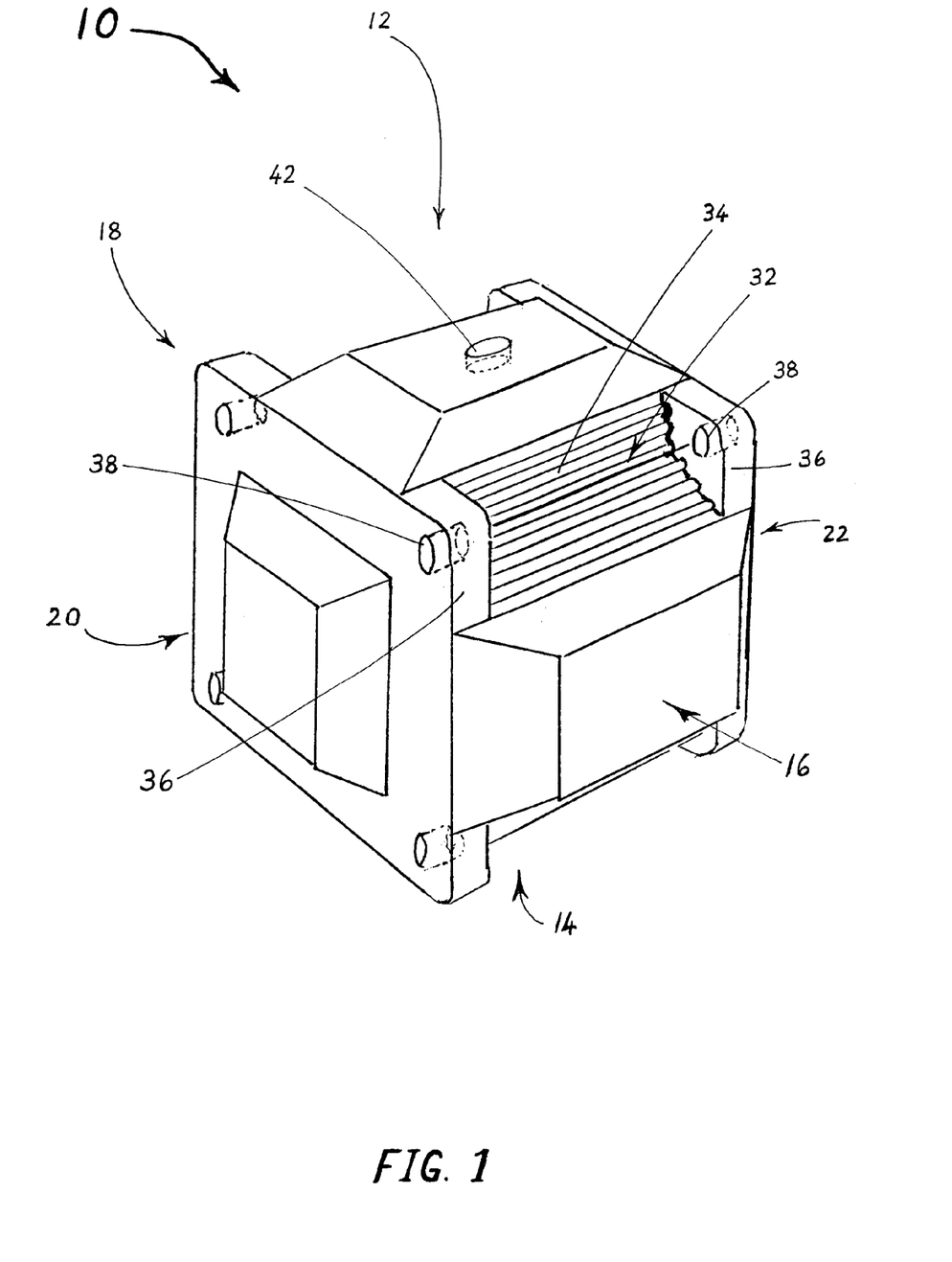
FIG. 1: Perspective view of a Multi-Faceted Recessed Cubic Wave Energy Dissipation Module.
Figure 2:
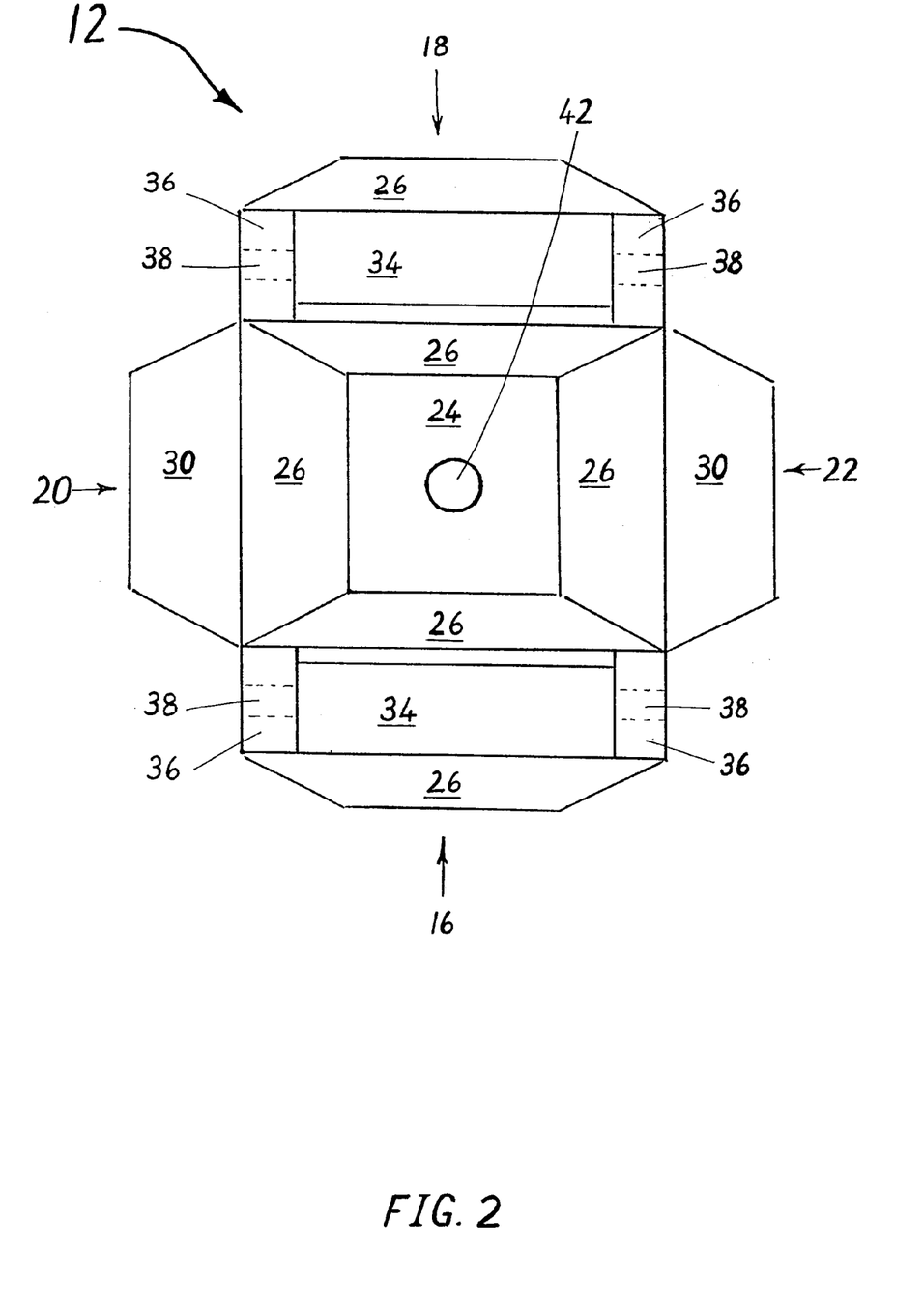
FIG. 2: Top or bottom plan view of a Multi-Faceted Recessed Cubic Wave Energy Dissipation Module.
Figure 3:
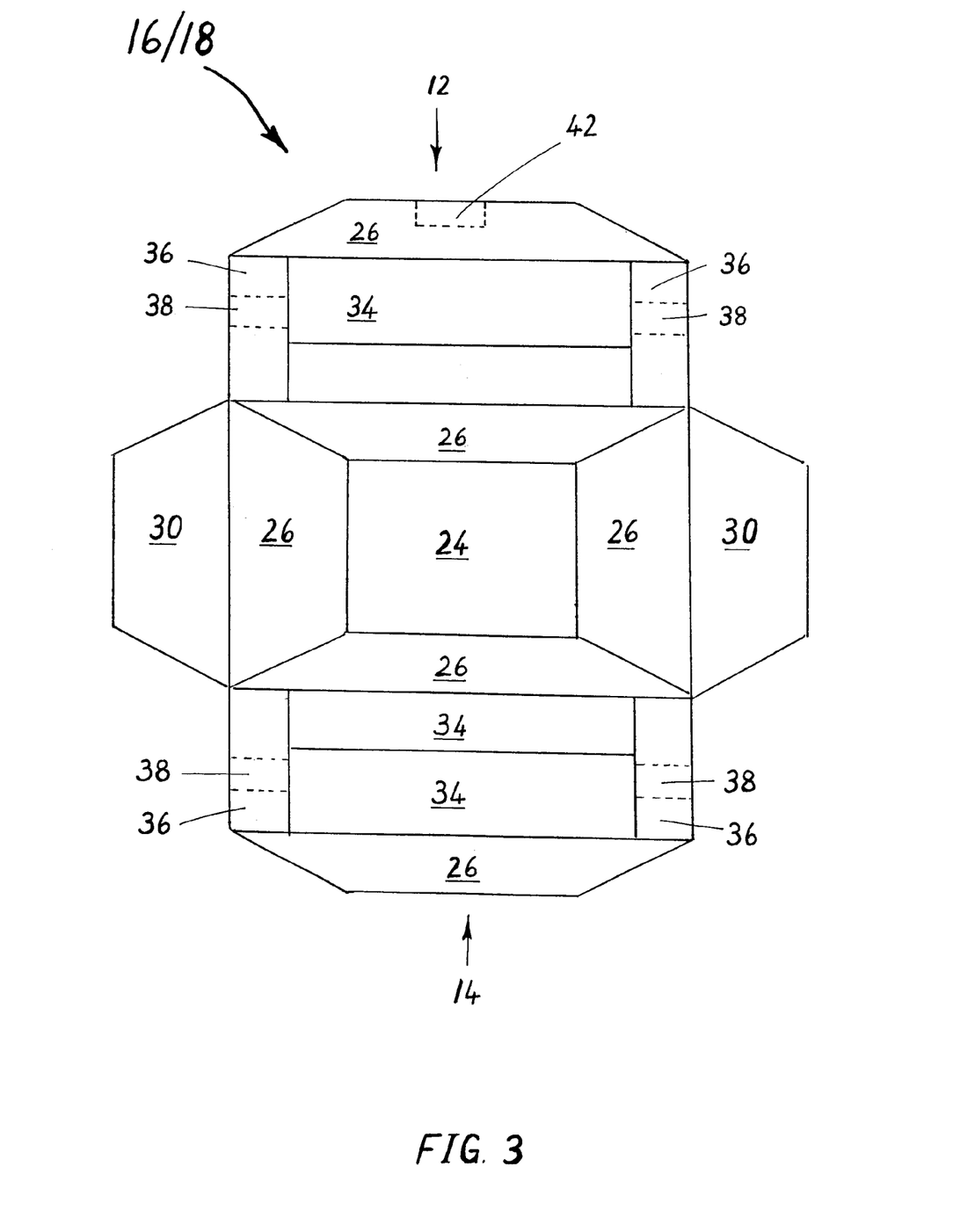
FIG. 3: Front or back elevational view of a Multi-Faceted Recessed Cubic Wave Energy Dissipation Module.
Figure 4:
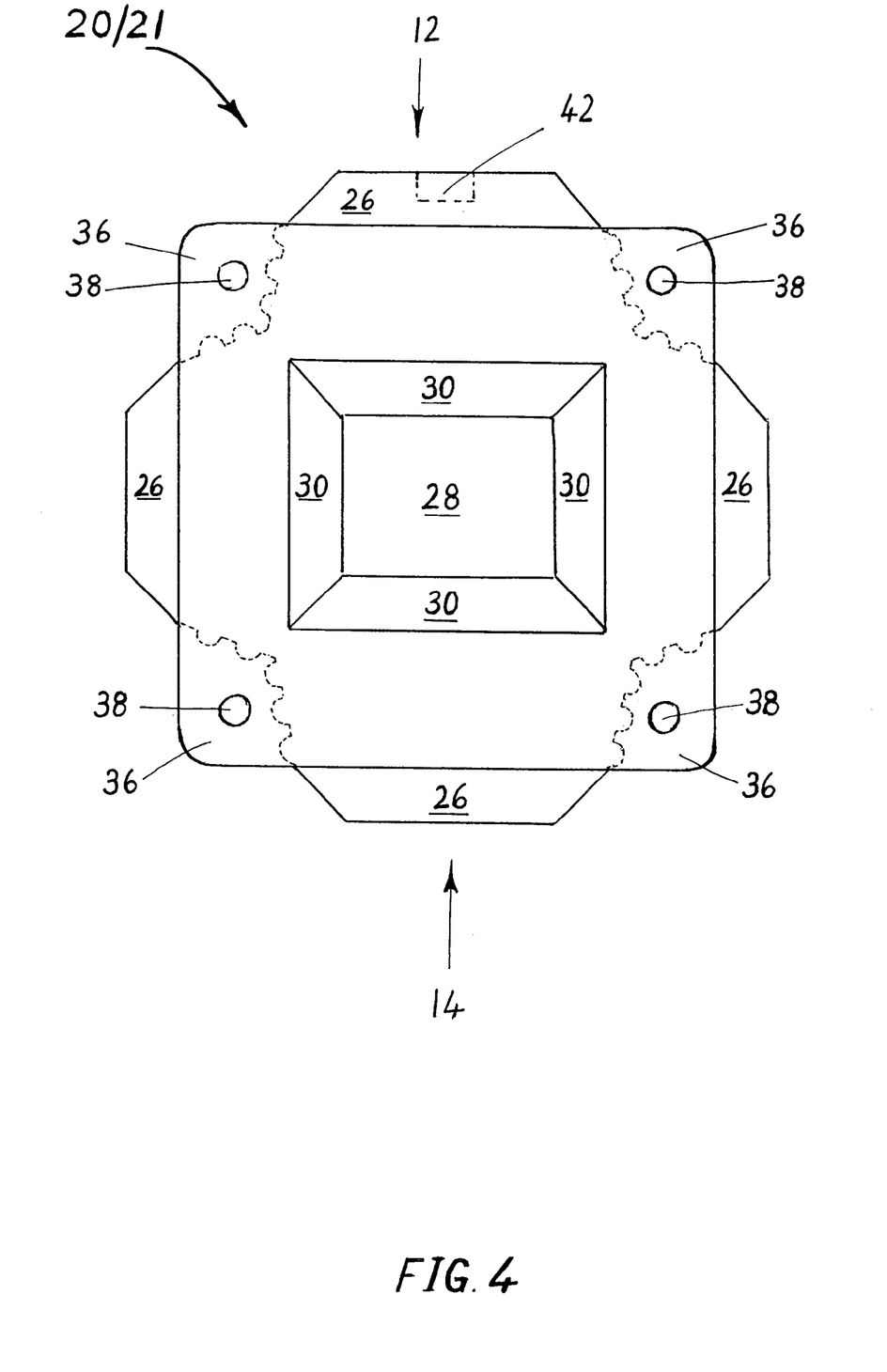
FIG. 4: First or second side elevational view of a Multi-Faceted Recessed Cubic Wave Energy Dissipation Module.

FIG. 1 shows a perspective view of a multi-faceted cubic wave energy dissipation module 10, hereinafter referred to as a module 10. The module 10 is preferably constructed from low density polyethylene using a rotor mold. This mode of construction allows the module to be hollow and of uniform thickness. A module that is 24 inches cubed, is light, easily moved, stacked and transported. However, modules of other sizes may be used depending upon the intended deployed environment.

Referring to FIGS. 1–5, the module 10 has a top 12, a bottom 14, a front 16, a back 18 a first side 20 and a second side 22. The top 12, bottom 14, front 16 and back 18 are equally symmetric each having a centered rectangular projection 24. Each rectangular projection 24 connects the first side 20 with the second side 22. Each rectangular projection 24 is bounded by four trapezium shaped coplanar facet surfaces 26, each equally inclined to the rectangular projections 24. The first side 20 and second side 22 are equally symmetric, each having a centered square projection 28. Each square projection 28 is bounded by four trapezium shaped coplanar facet surfaces 30, each equally inclined to the square projections 28.

The module 10 has recesses 32, that are intersecting inset ribbed surfaces 34 that are inclined to, and connect the top 12 and front 16, top 12 and back 18, bottom 14 and front 16, bottom 14 and back 18. Thick connecting flanges 36 define the corners of both the first side 20, and the second side 22. The recesses 32 formed by the inclined, inset ribbed surfaces 34 are generally concave as shown in dotted line in FIG. 4, the ribbed surfaces themselves being formed by spaced hemi-cylinders having their longitudinal axes extending between pairs of thick connecting flanges 36. The holes 38 connect the first side 20 and the second side 22 with the recesses 32. Holes 30 through the thick connecting flanges 36 of the first side 20 are axially aligned to those holes 30 through the connecting flanges 36 of the second side 22, to accept connecting members 40. Connecting members 40 which may be rigid, such as steel rod, or flexible, such as plastic pipe or polyester cordage connect a plurality of modules 10. A hole 42 is centered in the rectangular projection of the top 12 allowing fluid communication with the hollow inside of the module 10.

Figure 5:
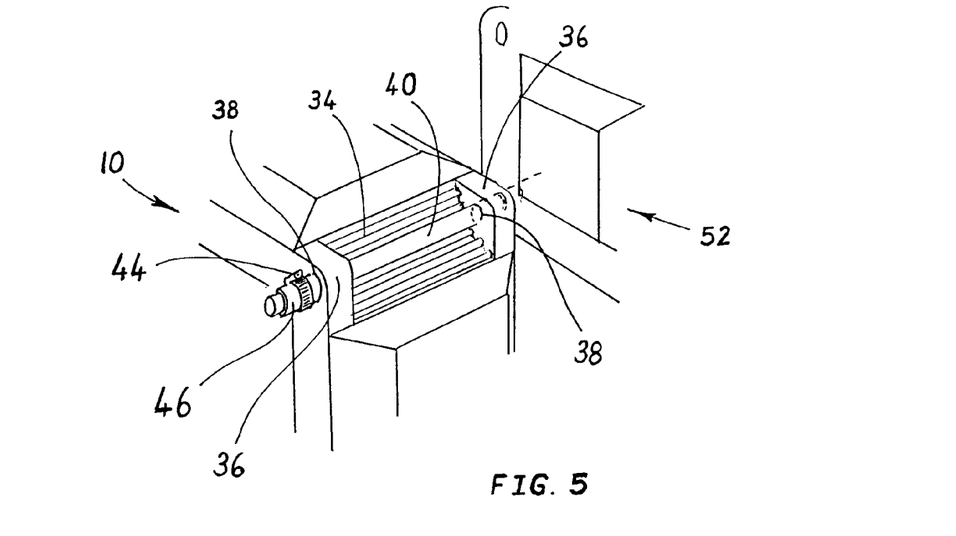
FIG. 5: Perspective view of parts of two connected modules.

FIG. 5 shows segments of two modules 10 that are rigidly connected by the connecting members 40. The connection is held by a first fastening device 44 that fits over a short length of flexible tubing 46, such as rubber hose. Both the first fastening device 44 such as a stainless steel hose clamp, and the flexible tubing 46 fit concentrically over the connecting member 40, such that when the fastening device is tightened it crimps the flexible tubing 46 onto the connecting member 40.

Figure 6:
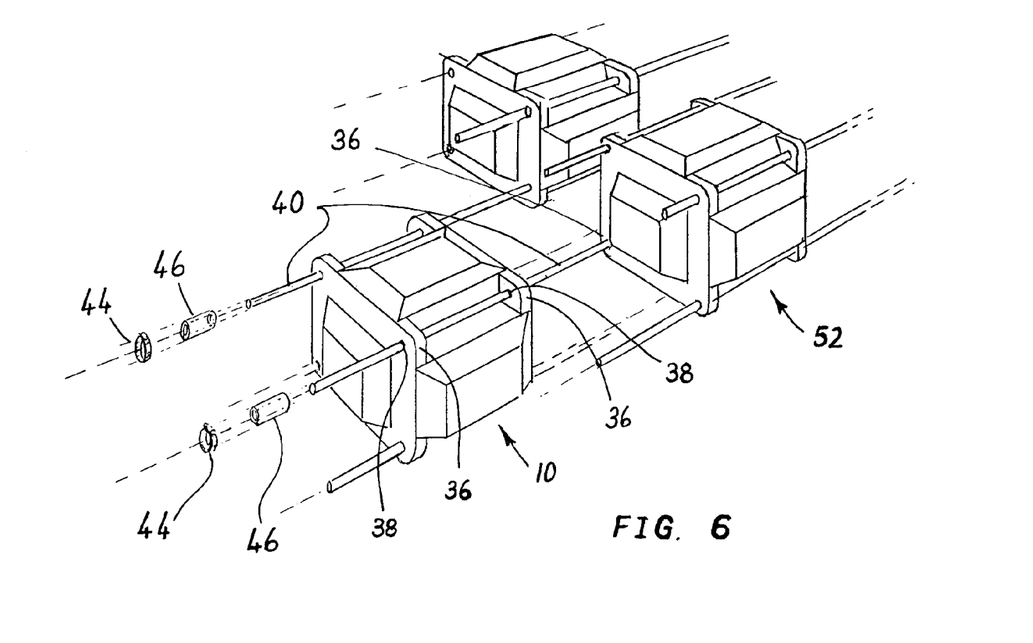
FIG. 6: Exploded perspective view of three Multi-Faceted Recessed Cubic Wave Energy Dissipation Modules with connecting members and fastening devices.

FIG. 6 demonstrates how modules 10 are joined together using the connecting members 40, first fastening devices 44, and flexible tubing 46.

Figure 7:
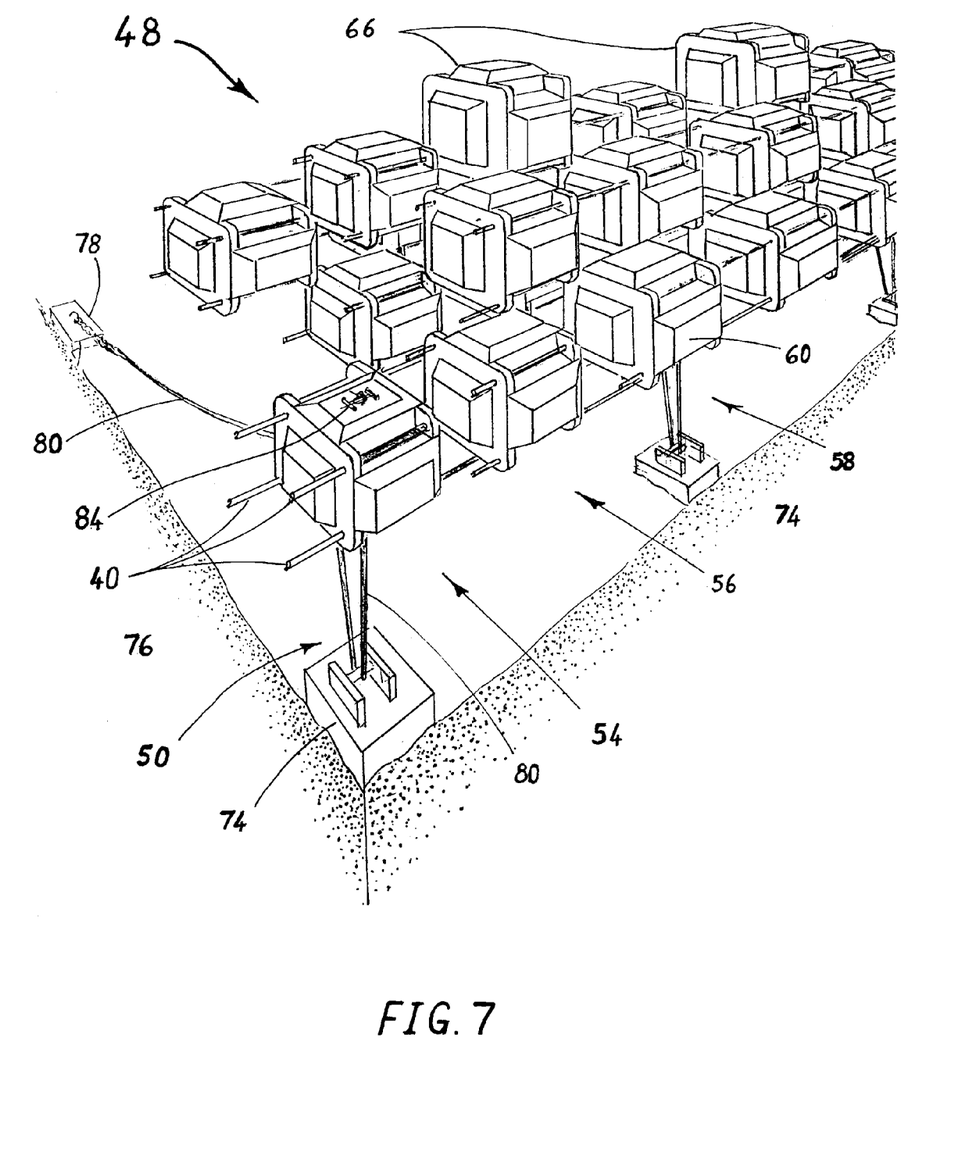
FIG. 7: Perspective view of a Water Wave Energy Dissipation System.

FIG. 7 is a perspective drawing of a water wave energy dissipation system 48, hereinafter referred to as the system, constructed of a plurality of modules 10, as may be disposed near a shoreline to dissipate water wave energy and control shoreline erosion and deposition of sand and other unconsolidated materials.

With reference to FIGS. 6, 7, 8, 9 and 10 the system 48 may be constructed in a continuous manner by successively joining groups of modules 10. These joined groups of modules form repeatable units along the longitudinal axis of the system 48. The repeatability in the construction allows the system 48 to be of any length and to be versatile to any shoreline application. Construction of the system 48 may be achieved from a platform or a boat that has dual pontoons. The system 48 may also be constructed on the water front, or at a remote location and transported in sections to the waterfront to be later deposed offshore by boat or platform.

The system 48 utilizes modules 10 for either buoyancy or ballast. If a module is constructed with dimensions of a 2 foot cube, then the module has an internal volume of approximately 6 cubic feet, giving the module about 360 pounds of buoyancy in fresh water. A module filled with sand alone has weight of approximately 750 pounds in fresh water. The system 48 is designed to channel water from the incoming waves into the recesses 32 of the modules 10. As the water flows into the recesses 32 any laminar flow is broken into turbulent flow by the ribbed surfaces 34. This flow is further broken and disturbed by the connecting member 40 that is disposed through the recesses 32. The turbulent flow created in the recesses 32 is further channeled into voids and other recesses of other modules to extend the flow distance and maximize the hydraulic resistance and frictional loss of energy of the water wave flowing through the system 48. An anchoring system 50 positions the system 48 near to the shoreline such that the oncoming water waves are always incident upon the same side of the system 48. Incident water waves on the system 48 create tension in the anchoring system 50. The anchoring system 50 stretches to accommodate this tension. The work done by the incident water wave to stretch the anchoring system 50 is converted to potential energy that is stored in the anchoring system 50 and released by conversion to kinetic energy as the anchoring system 50 pulls the system 48 back towards its neutral position against the incoming water wave.

FIGS. 5, 6, 7, 8, 9, and 10 show construction of the system 48, is achieved by connecting a plurality of modules 10 together using connecting members 40. Pairs of holes 38 on one module 10 are aligned with pairs of holes 38 on a second module 52. The connecting member 40 is disposed through the aligned holes 38, and held rigidly by tightening the fastening device 44 that crimps the flexible tubing 46 onto the connecting member 40. The thick connecting flange 36 of module 10 abuts the thick connecting flange 36 of module 52.

A lowest level of modules 54 of the system 48 are alternately ballast and water filled. One inch steel rods are used as the connecting members 40 to join the lowest level modules 54 to a second level of modules 56. The system 48 is constructed such that lowest level modules 54 abut pairs of a second level of modules 56, that in turn abut a second lowest level module 54 creating a sequence alternating between the lowest level modules 54 and the second level modules 56. The hole 42 in the second level modules 56 allows water communication between the hollow inside of the modules and that of where the system 48 is deployed.

A third level of modules 58 is attached to the second level of modules 56, by disposing connecting members 40 through pairs of holes in a manner similar to the method of connecting the lowest level modules 54 to the second level modules 56. Pairs of second level modules 56 abut groups of three of the third level modules 58, that in turn abut pairs of second level modules 56. The third level modules are rigidly held in place by disposing connection members 40 through aligned pairs of holes in the alternation of second level modules 56 and third level modules 58. The connecting member 40 used to connect the second level modules 56 to the third level modules 58 is a tight weave one inch polyester cordage. An outer module 60 of the third level of modules 58 is sealed and forms a buoyant member of the system 48. A central module 62 of the third level modules 58 is water filled through the hole 42.

A fourth level of modules 64 is attached to the third level of modules 58 in a similar manner to that described above for the second level of modules 56 and the third level of modules 58. The connecting members 40 are tight one inch weave polyester cordage. Pairs of forth level modules 64 abut the groups of three third layer modules 58. Water may be introduced into the generally sealed pairs of the forth-level modules 64 to adjust the buoyancy and thus the flotation level of the system 48 in the water. These adjustments are made such that the outside water level is at the top of the third level of modules 58. A top level of modules 66 is attached to the forth level of modules 64 with connecting members 40 of tight weave one inch polyester cordage, or ¾ inch schedule 80 plastic pipe. The hole 42 in the top 12 of the top level of modules 66, may be a threaded 2 inch NTP opening to accept a flag, marine or nautical light or other accessory fitted with a 2 inch barrel fitting. The hole in the top 12 of any of the modules 10 used to construct the system may be open or sealed, depending upon the location of the module 10 in the system 48 and its purpose to be buoyant, ballast or water filled for almost neutral buoyancy. In the case of the water filled modules 10, a second hole may be drilled in the bottom 14 to encourage the free flow of water into and out of the module 10.

Figure 10:
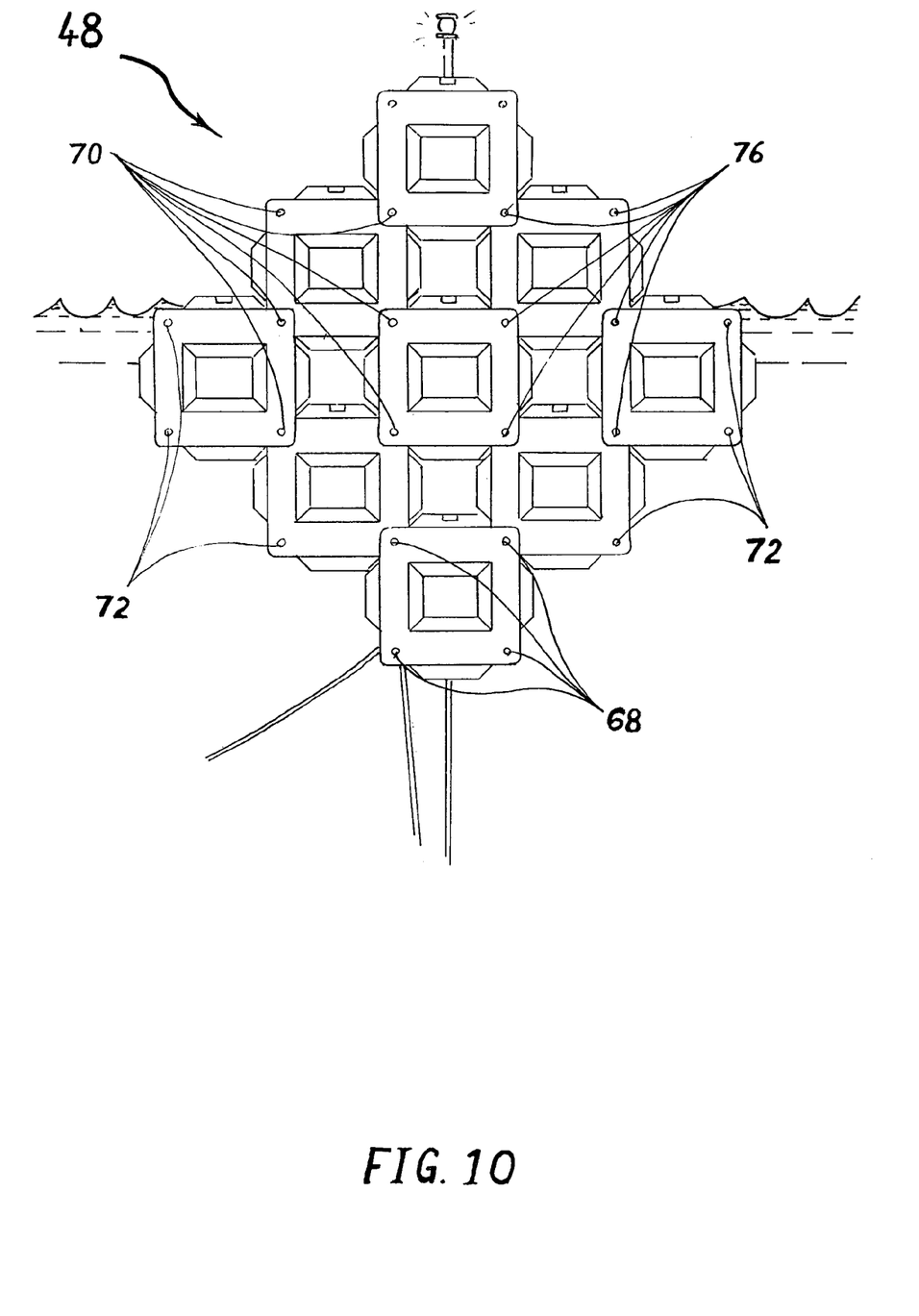
FIG. 10: End-on elevational view of Water Wave Energy Dissipation System.

FIG. 10 is an end view of the system 48. In particular, it shows portions of the connecting members 40 that are either 1 inch steel rods 68, tight weave one inch polyester cordage 70, or ¾ inch schedule 80 plastic pipe 72.

Figure 8:
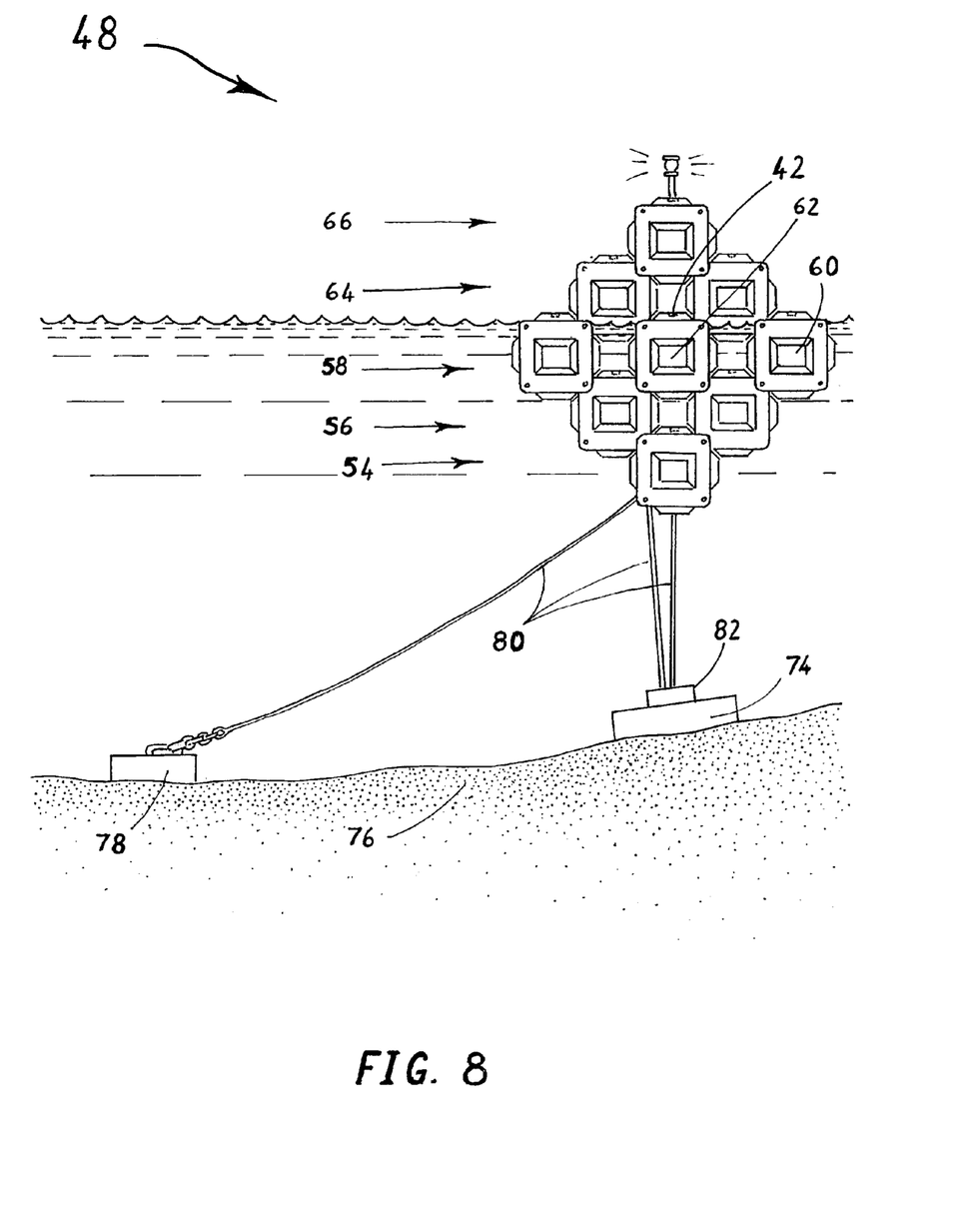
FIG. 8: End-on elevational view of Water Wave Energy Dissipation System deployed with anchoring system.
Figure 9:
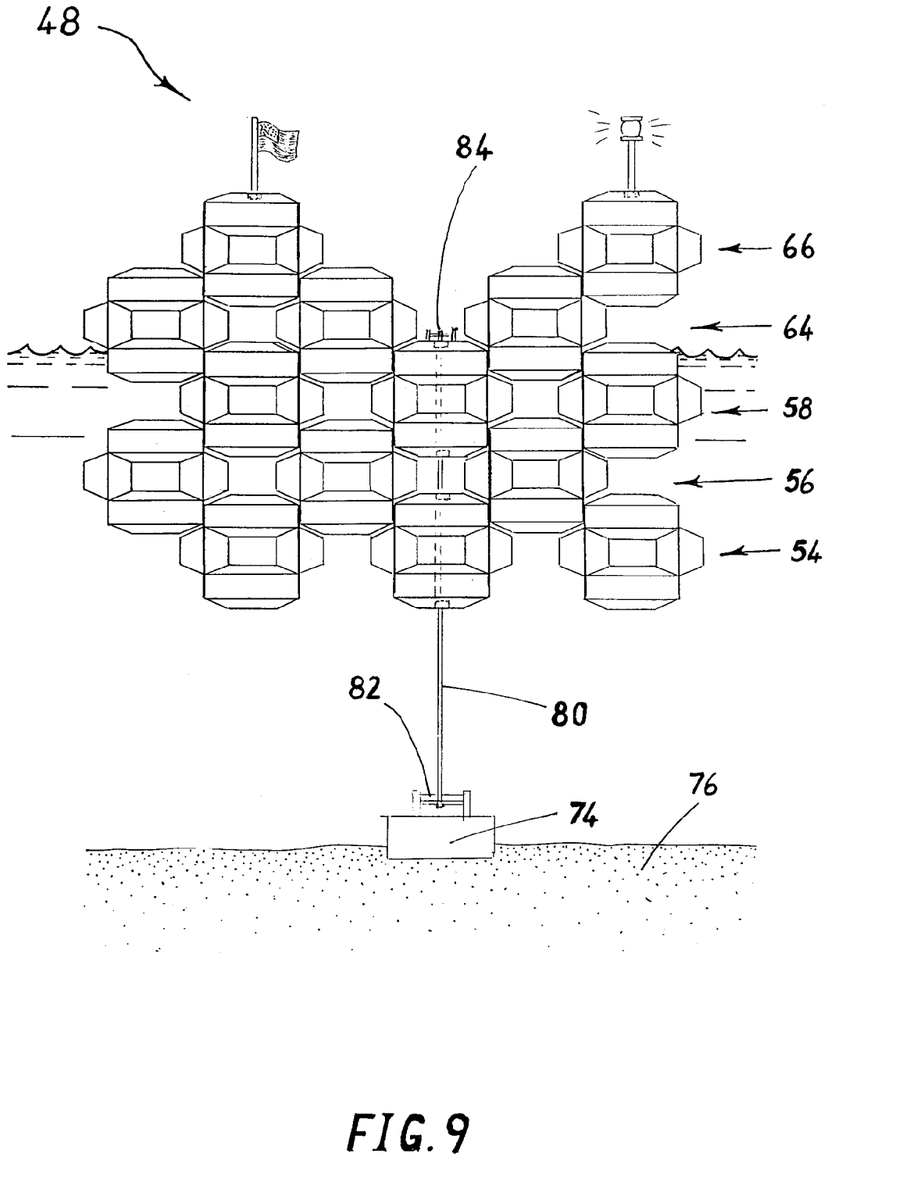
FIG. 9: Front elevational view of Water Wave Energy Dissipation System deployed with anchoring system.

The anchoring system 50 is attached to the system 48, and comprises a first anchor weight 74 beneath the system resting on an ocean/lake bed 76, a second anchor weight 78 at some distance from the system 48 in the direction of the oncoming water wave energy, and an anchor connecting cord 80. The anchor connecting cord 80 is securely fastened at one end to the second anchor weight 78. The anchor connecting cord 80 is threaded around the lower steel connecting member of the first level of modules 54 and a steel cleat 82 of the first anchor weight 74. The free end of the anchor connecting cord 80 is finally threaded through holes in the first level module 154 and the middle third level module 62 to be securely fastened by a second fastening device 84. The anchor connecting cord 80 although securely fastened at both ends, is able to freely move over the steel bar of the first level module 54 and the steel cleat 82 of the anchor weight 74. The anchoring system 50 is duplicated in application along the longitudinal length of the system 48 and is disposed where the first level module 54 is water filled. If nylon rope is used for the anchor connecting cord 80, it will be able to stretch as tension is exerted on it by the incoming water waves pushing against the system 48.

A plurality of modules 10 may be used as a flotation and stabilization device for a floating pontoon or dock. The advantages of using modules for this application are that they are easily deployed to create a dock or marina of any length; flotation level of the dock/marina may be adjusted; the material of the modules is inert and poses no threat to the environment; because the material of the modules is inert it has a long lifetime, reducing the need to change or overhaul the deck or marina; finally, the dock or marina can remain in the water over winter as the modules are unaffected by ice.

Figure 11:
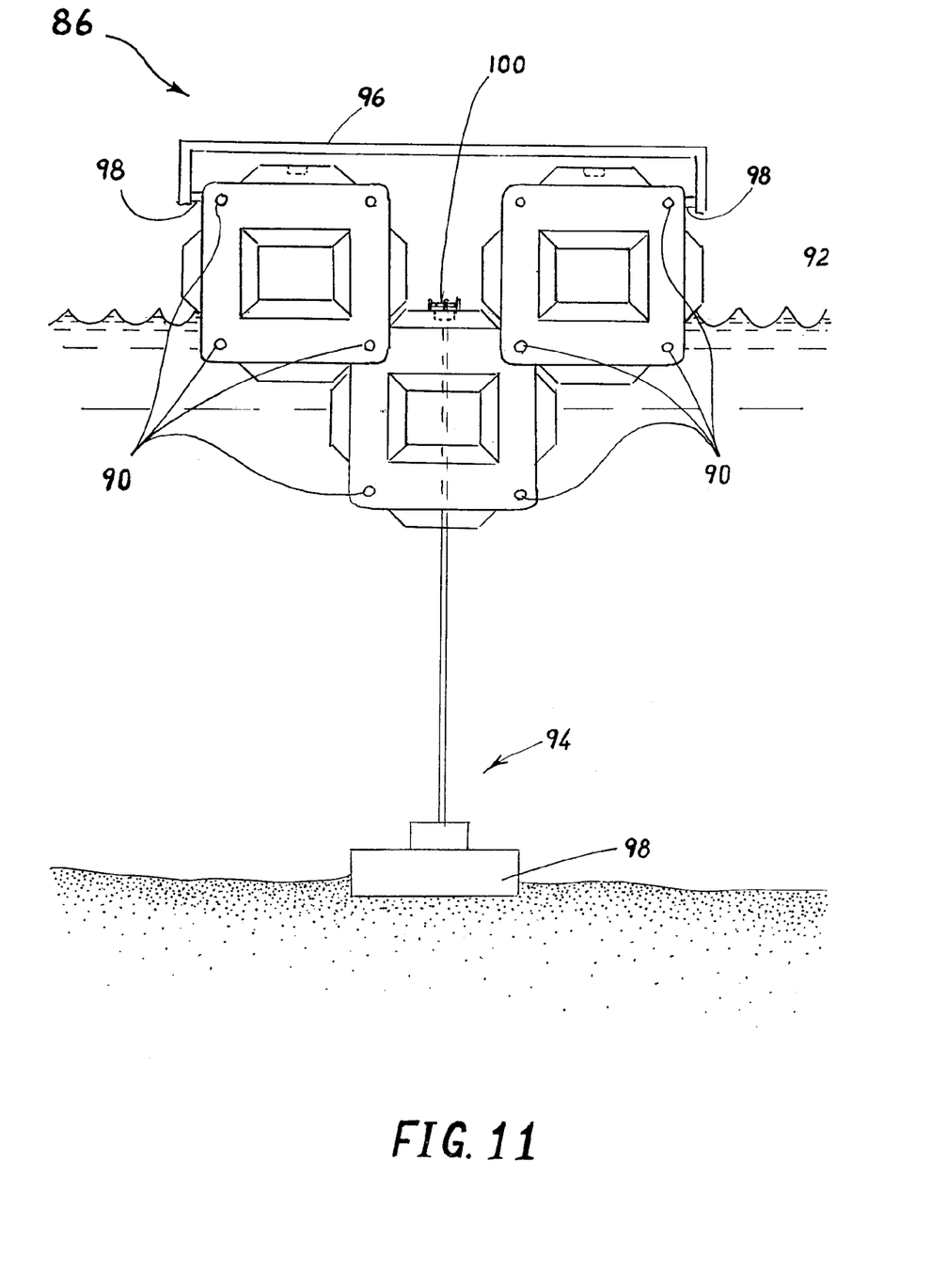
FIG. 11: End-on elevational view of a dock or marina using modules as flotation stabilization devices.

FIG. 11 shows a floating dock or marina 86, hereinafter referred to as a dock. A lowest level of dock modules 88 are attached by dock connecting members 90 to a second level of dock modules 92 in a similar manner to the construction of the system 48 as detailed above. The lowest level of dock modules 88 are alternately sand and water filled. The second level of dock modules 92 are air filled and sealed for buoyancy. Flotation level and stability are adjusted by adding water to the second level of dock modules 92. The dock 86 is anchored by a dock anchoring system 94. A deck 96 of the dock 86 is attached to the second level of dock modules 92 by an attaching member 98 that clamps the deck 96 to the dock connecting member 90, used to connect groups of modules. The dock anchoring system 94 may be a single line with one end securely fastened to an anchor weight 98, and the other end threaded through holes in the water filled lowest level dock module 88 to be securely fastened by a third fastening device 100. The dock anchoring system 94 may be similar to the anchoring system 50 deployed with the system 48 as described above.

Figure 12:
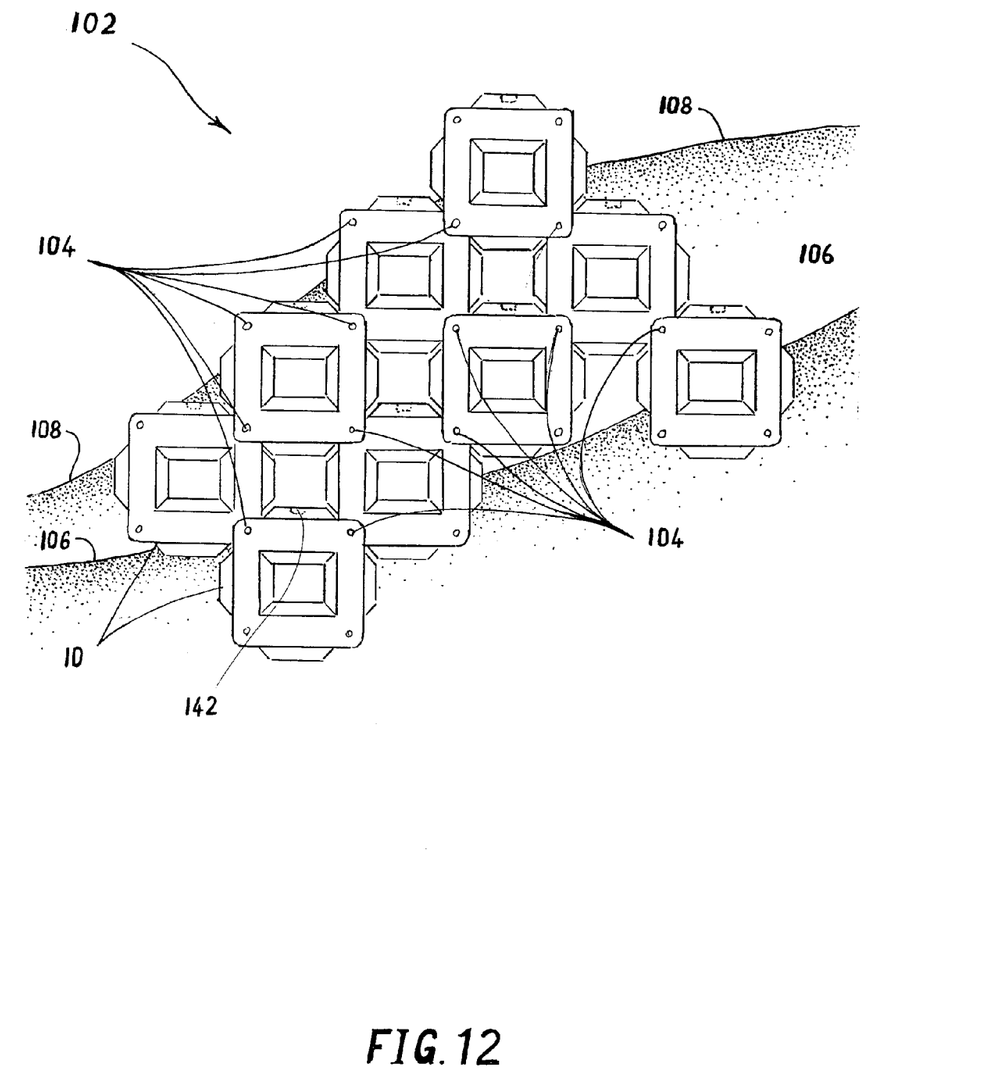
FIG. 12: End-on elevational view of beach wall.

FIG. 12 is an end-on view of a plurality of modules 10 joined together to form a beach wall 102 that is partly buried in a beach or near a cliff face to enhance deposition of unconsolidated materials into wider deeper beach to create a stable shoreline environment. Such a system is key to neutralizing wave erosion and undermining of cliffs with subsequent loss of land. The versatility of the modules enables the beach wall to be built progressively higher as deposition continues. Modules are joined in a similar manner as described above for constructing the system 48. Beach wall connecting members 104 for the wall 102 are of tight weave one inch polyester cordage. Each module 10 is filled with sand through the hole 42. An old beach surface 106 has the wall 102 partly buried in it. A new beach surface 108 is gradually formed by deposition of unconsolidated materials, particularly during a storm when high water washes over the wall 102. As the water ebbs back down the beach it flows through the wall 102. The forced turbulent flow slows the water movement resulting in the deposition of any suspended material. The slope of the new beach surface 108 is closer to horizontal than the old beach surface 106, as the partly buried wall 102 defines the slope of the new beach and stops the materials from being eroded and washed away by incoming water wave energy. As the material of the modules 10 is inert, the wall 102 can remain as a permanent structure and an integral part of the beach, possibly to be completely covered by beach material as deposition continues.

What is claimed is:

1. A module for a wave energy dissipation system arranged to dissipate the energy of waves striking the module comprising:
    (a) a generally cubical hollow body having front face for disposition in a direction facing incoming wave action, opposite sides, a top and a bottom;
    (b) flanges at each of the corners of the body forming opposed pairs of flanges, the pairs of flange having axially aligned mounting apertures arranged to receive connector means for connecting the body to similar bodies for forming a wave energy dissipation system;
    (c) a recess portion between the flanges connecting the top and front face; and
    (d) the recess portion having an inclined surface comprising a plurality of longitudinally extending boundary layer interrupting projections substantially disrupting any laminar flow of a water wave entering the recess thereby creating turbulent flow.

2. The module of claim 1 in which the body has six faces.

3. The module of claim 2 in which each face comprises a first rectangular surface, a plurality of trapezoidal surfaces arranged in a generally pyramidal configuration, attached to the first surface and a second generally rectangular surface connected to the plurality of trapezoidal surfaces.

4. The module of claim 2 in which each face comprises a truncated pyramidal surface.

5. The module of claim 4 in which the truncated pyramidal surface comprises flat side surfaces and a flat top.

6. The module of claim 5 in which the truncated pyramidal surface comprises four sides.

7. The module of claim 1 in which the surface of the recess comprises a ribbed surface.

8. The module of claim 7 in which the ribbed surface comprises a plurality of spaced generally parallel hemicylinders.

9. The module of claim 1 in which the surface of the recess comprises a roughened surface.

10. The module of claim 1 in which the flanges are triangular.

11. The module of claim 1 comprising a rigid rod disposed through the recess between opposed pairs of flanges and extending through the axially aligned apertures in each of the flanges in an opposed pair of flanges.

12. The module of claim 1 in which the inclined surface of the recessed portion is generally concave.

13. A wave energy attenuating assembly comprising
  (a) at least a pair of modules each being a generally cubical hollow body including a pair of opposed flanges at corners of the body, the flanges each having axially aligned mounting apertures and between the flanges a recessed portion connecting a wave facing front of the module to the top of the module, each recessed portion comprising a surface characterized by a plurality of boundary layer interrupting projections for disrupting laminar flow of water directed against the surface and creating turbulent flow; and
  (b) a rigid rod, the rigid rod being disposed through the recessed portion and passing through the apertures for connecting one of the modules one to another.

14. A module for a wave energy dissipation system comprising:
  (a) a generally cubical, hollow body;
  (b) a pair of generally rectangular side plates forming opposed faces of the body;
  (c) the side plates having a pair of axially aligned mounting apertures in corresponding corners of the side plates for connecting the body to similar bodies for forming a wave energy dissipation system; and
  (d) a generally concave longitudinally extending recess portion disposed between the corners of the side plates, the recess portion having a surface characterized by a plurality of boundary layer interrupting projections substantially disrupting any laminar flow of water past the surface and creating turbulent flow.

15. The module of claim 14 comprising a first generally pyramidal projection, attached to a first surface of at least one of the side plates, the projection having a generally rectangular end surface connected to the first surface by a plurality of inclined trapezoidal surfaces.

16. The module of claim 15 comprising a plurality of truncated pyramidal projections othoganal to the first projection extending from different surfaces of the body.

17. The module of claim 14 in which the surface of the recess comprises a ribbed surface.

* * * * *